H. PEARCE & J. E. BILLINGTON.
TYPOGRAPHICAL COMPOSING MACHINE.
APPLICATION FILED AUG. 19, 1908.

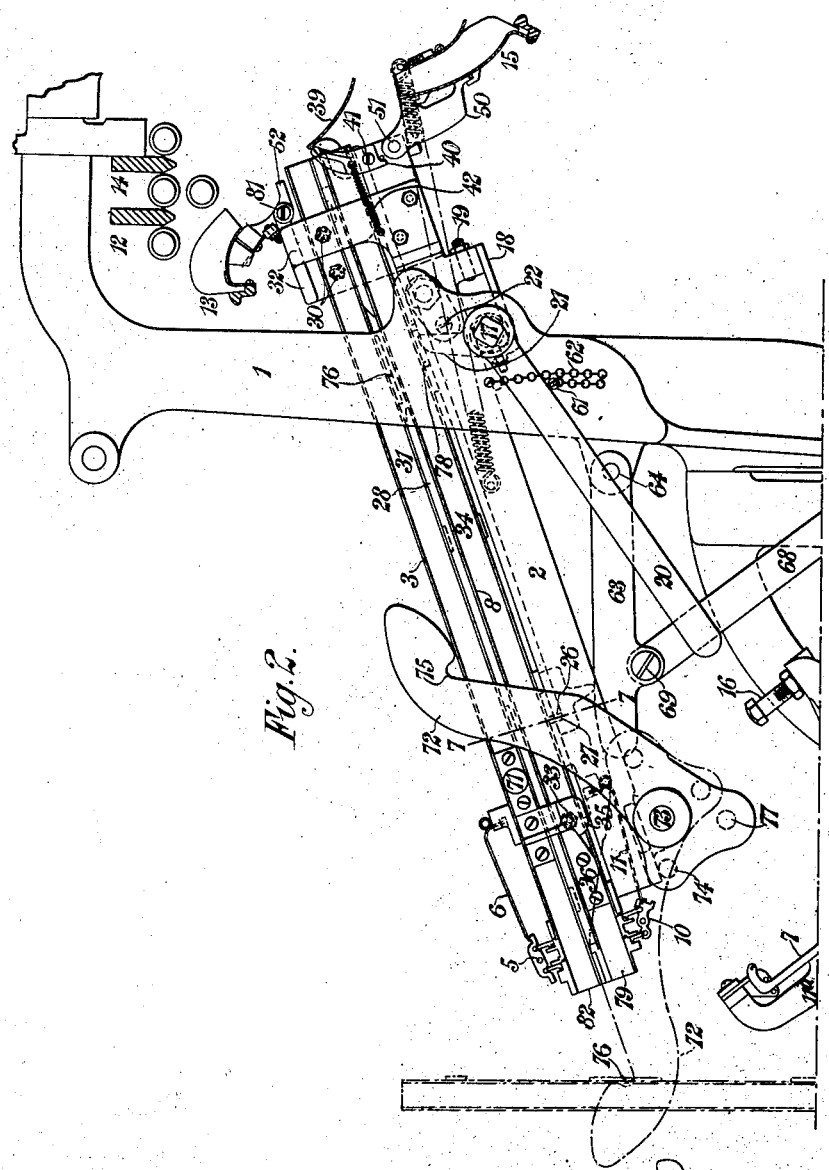

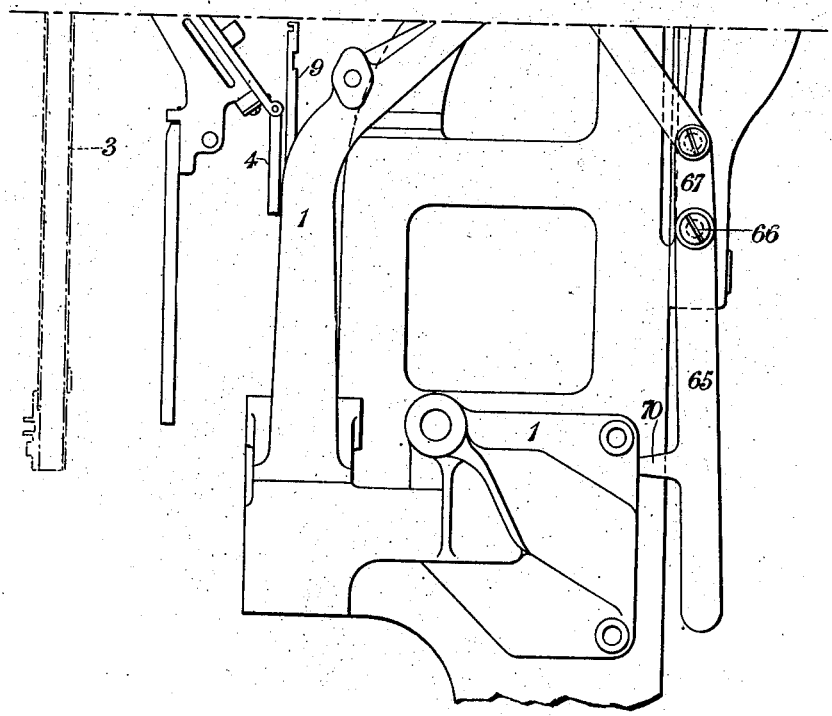
Fig. 2ᵃ

954,459.

Patented Apr. 12, 1910.
16 SHEETS—SHEET 5.

H. PEARCE & J. E. BILLINGTON.
TYPOGRAPHICAL COMPOSING MACHINE.
APPLICATION FILED AUG. 19, 1908.
954,459.
Patented Apr. 12, 1910.
16 SHEETS—SHEET 7.
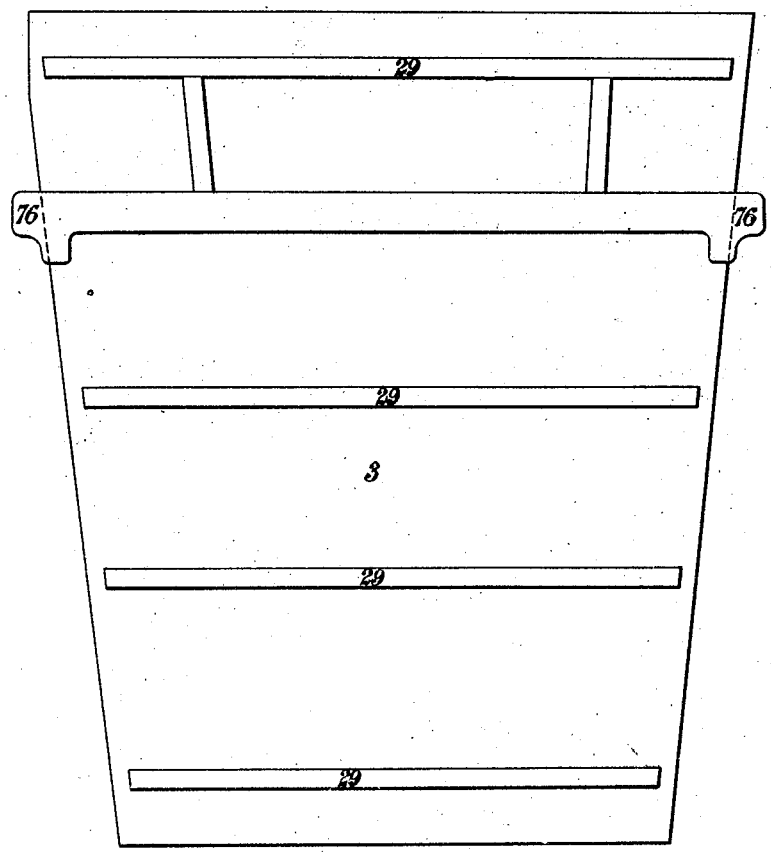
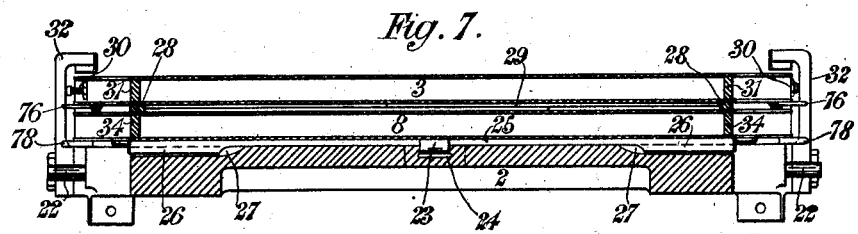

H. PEARCE & J. E. BILLINGTON.
TYPOGRAPHICAL COMPOSING MACHINE.
APPLICATION FILED AUG. 19, 1908.

954,459.

Patented Apr. 12, 1910.
16 SHEETS—SHEET 14.

UNITED STATES PATENT OFFICE.

HERBERT PEARCE AND JOHN ERNEST BILLINGTON, OF BROADHEATH, ENGLAND.

TYPOGRAPHICAL COMPOSING-MACHINE.

954,459.  Specification of Letters Patent.  Patented Apr. 12, 1910.

Application filed August 19, 1908. Serial No. 449,297.

*To all whom it may concern:*

Be it known that we, HERBERT PEARCE and JOHN ERNEST BILLINGTON, subjects of the King of the United Kingdom of Great Britain and Ireland, and residing at Linotype and Machinery Works, Broadheath, in the county of Chester, England, have invented new and useful Improvements in Typographical Composing-Machines, of which the following is a specification.

This invention relates to improvements in typographical composing machines of the type characterized by matrix magazines positioned one above the other upon the machine between a distributing mechanism behind them and an assembling mechanism in front of them.

The object of it is to facilitate what is known in the art of linotyping, as a "quick change", i. e., the taking of one or more magazines off the machine and the substitution of another or others containing a different font or fonts of matrices, for the magazine or magazines so taken off, respectively.

The invention is characterized by a capacity on the part of all the magazines, for being taken off the machine over and down the front of it and placed upon it upward and rearward over the front of it. The nature of it will be best understood from a description of the application of it to the composing machine described in the specification of Letters Patent No. 787,817; although it must be understood that the improved construction of the magazines, the improved means providing for one or more of them being taken off the machine, for one or more being substituted for the same, and for lowering them again, are not restricted to machines the magazines of which, like those of the above mentioned patent, must be retracted far enough to disengage their escapements from the escapement actuating mechanism, before the magazine or any of them can be "quick-changed".

Figure 1:
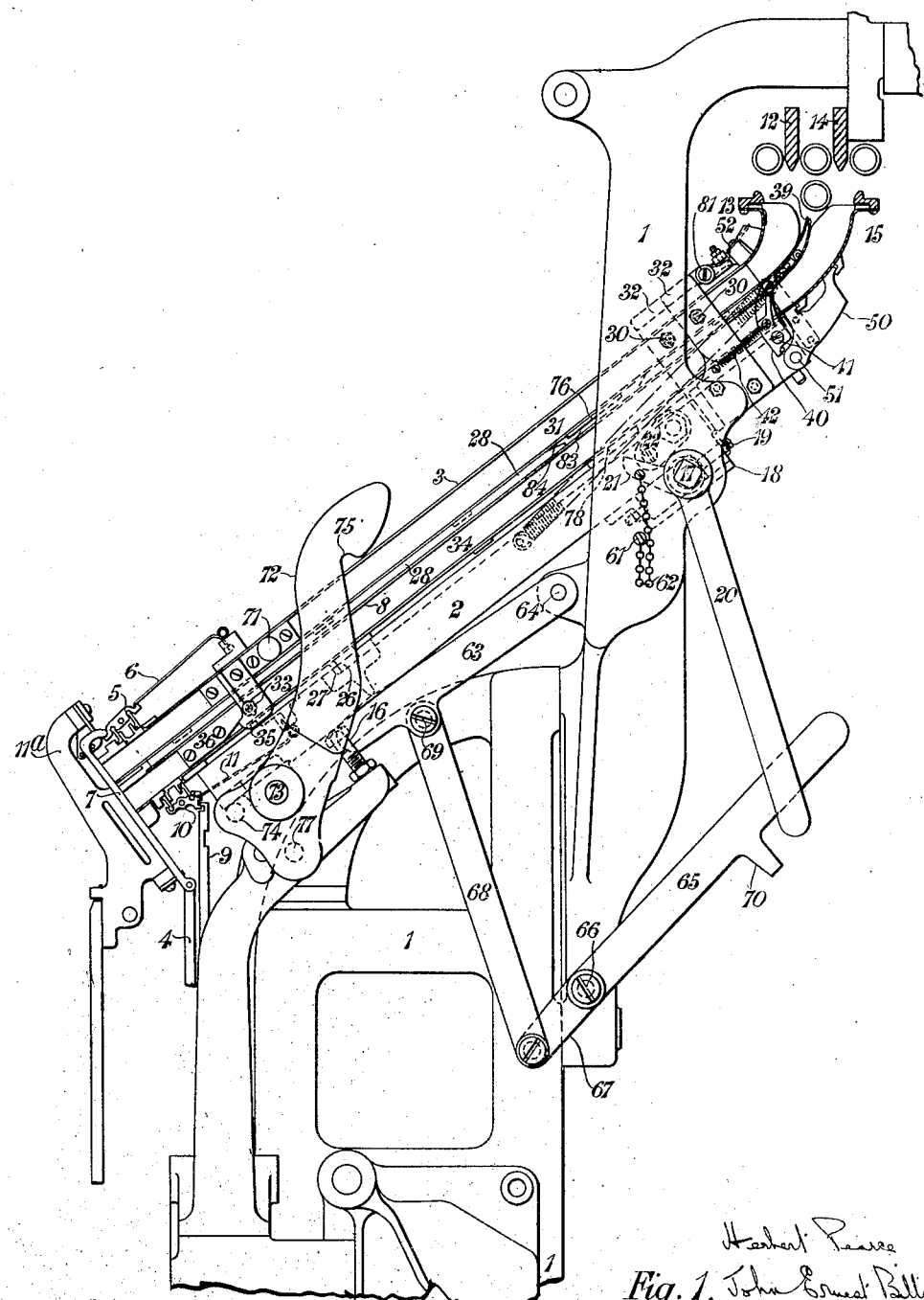
Figure 3:
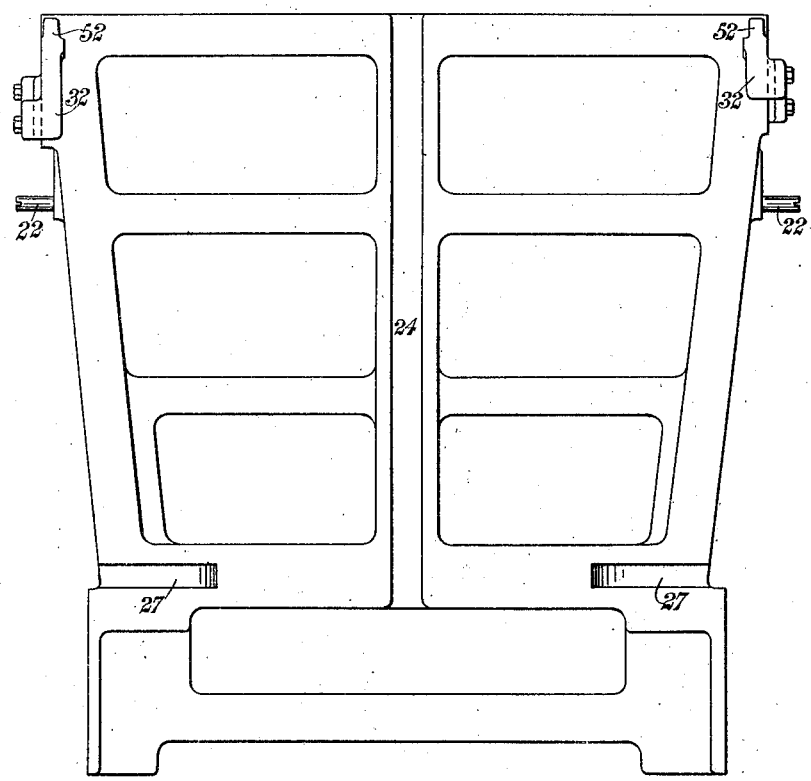
Figure 4:
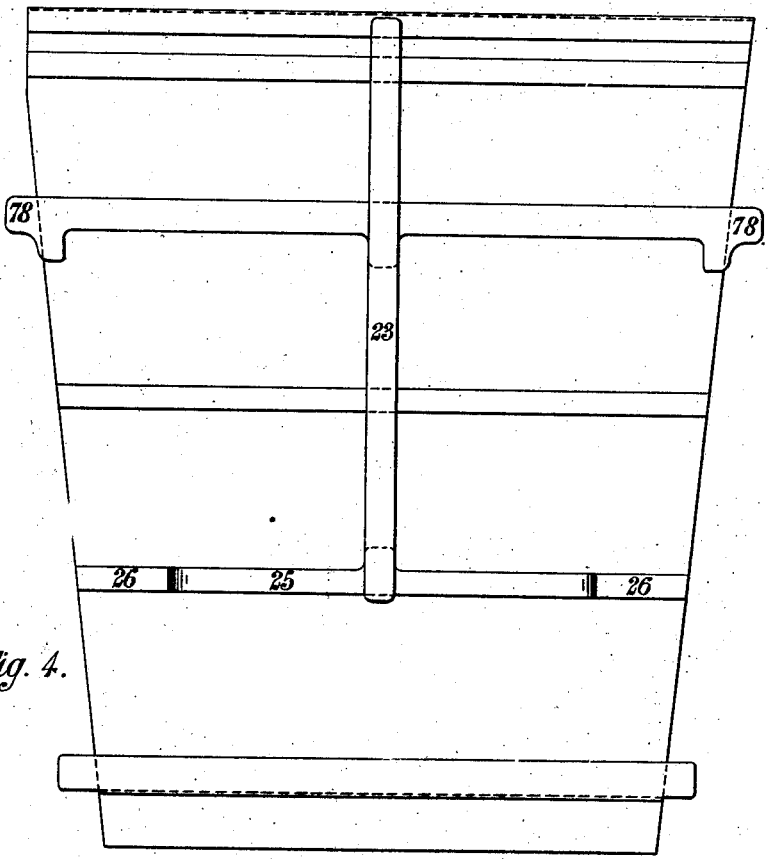
Figure 5:
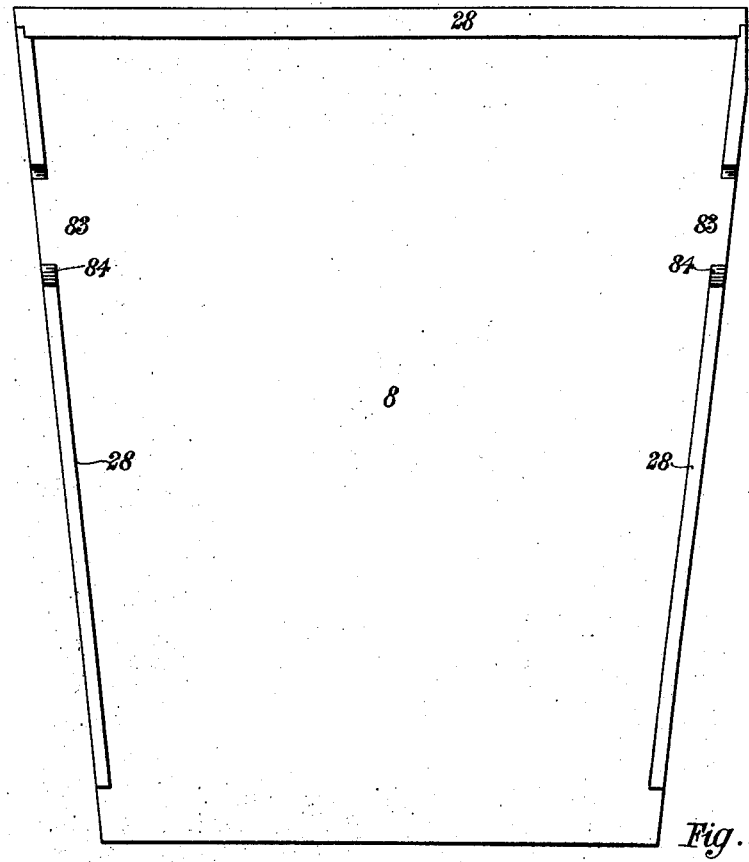
Figure 8:
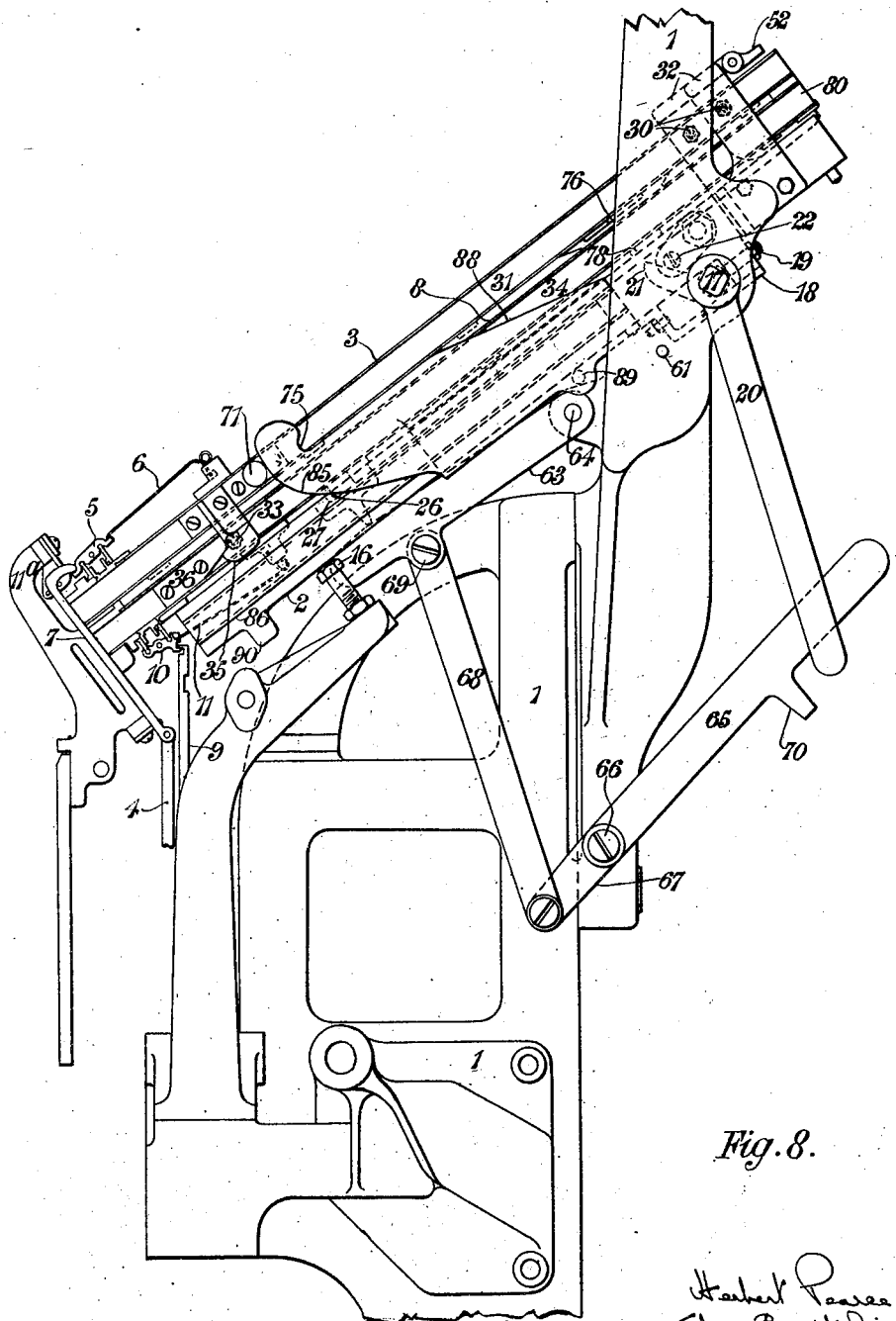
Figure 9:
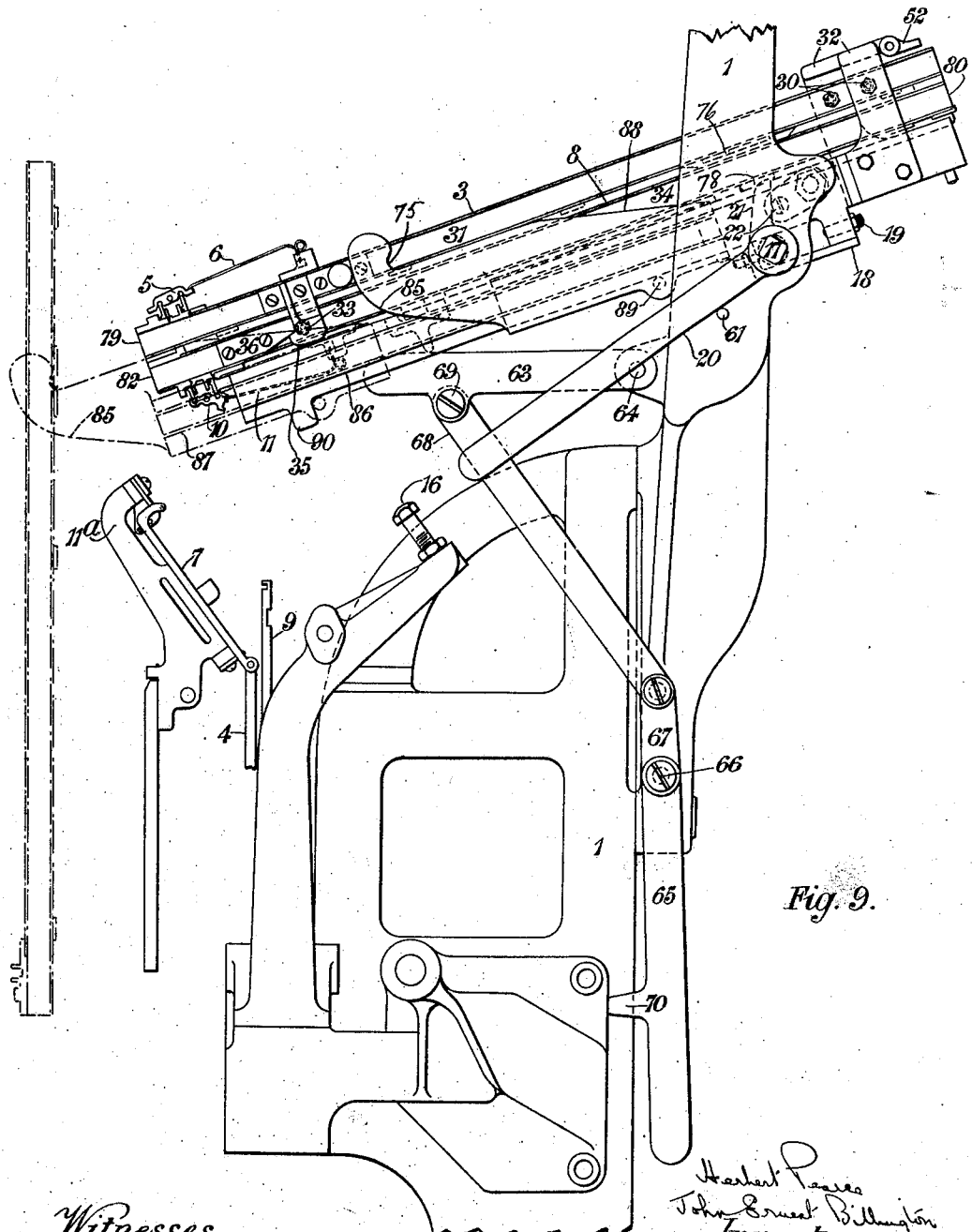
Figure 10:
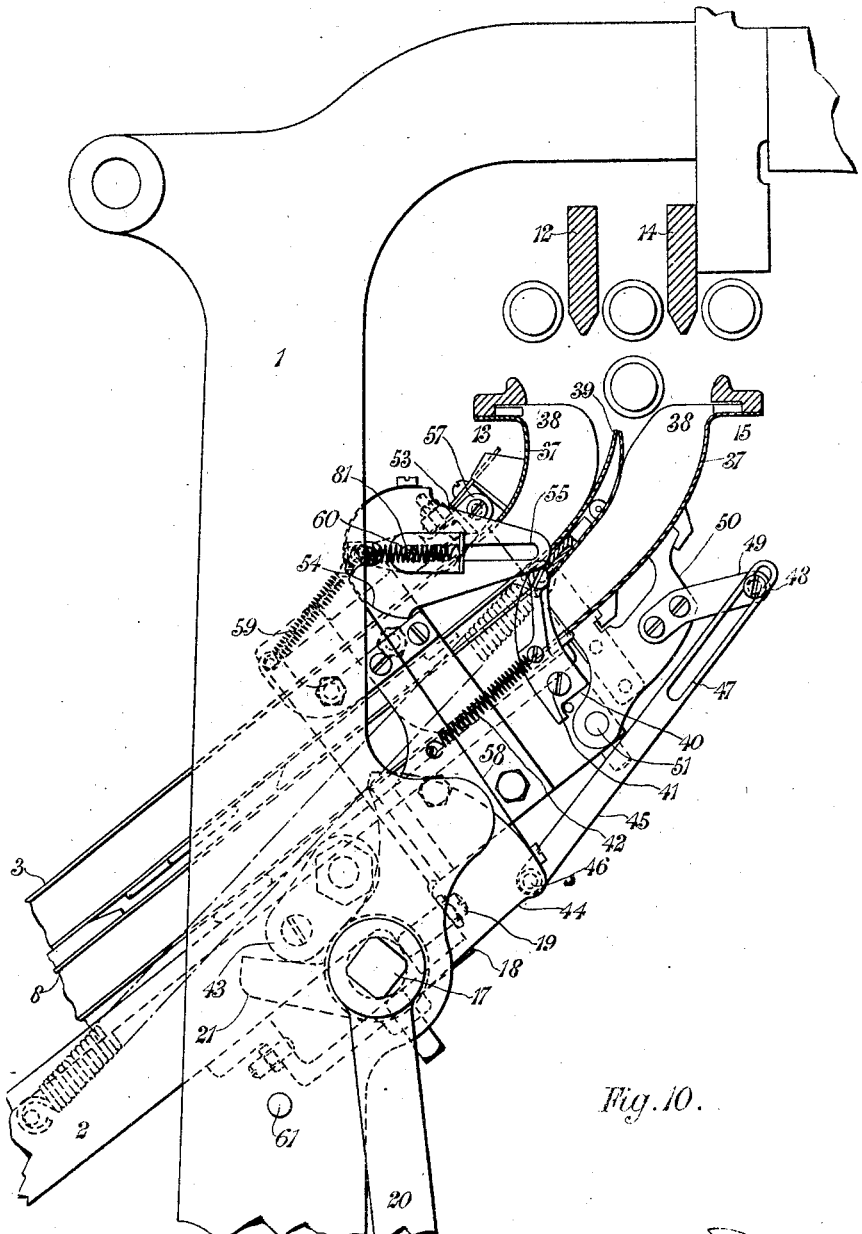
Figure 11:
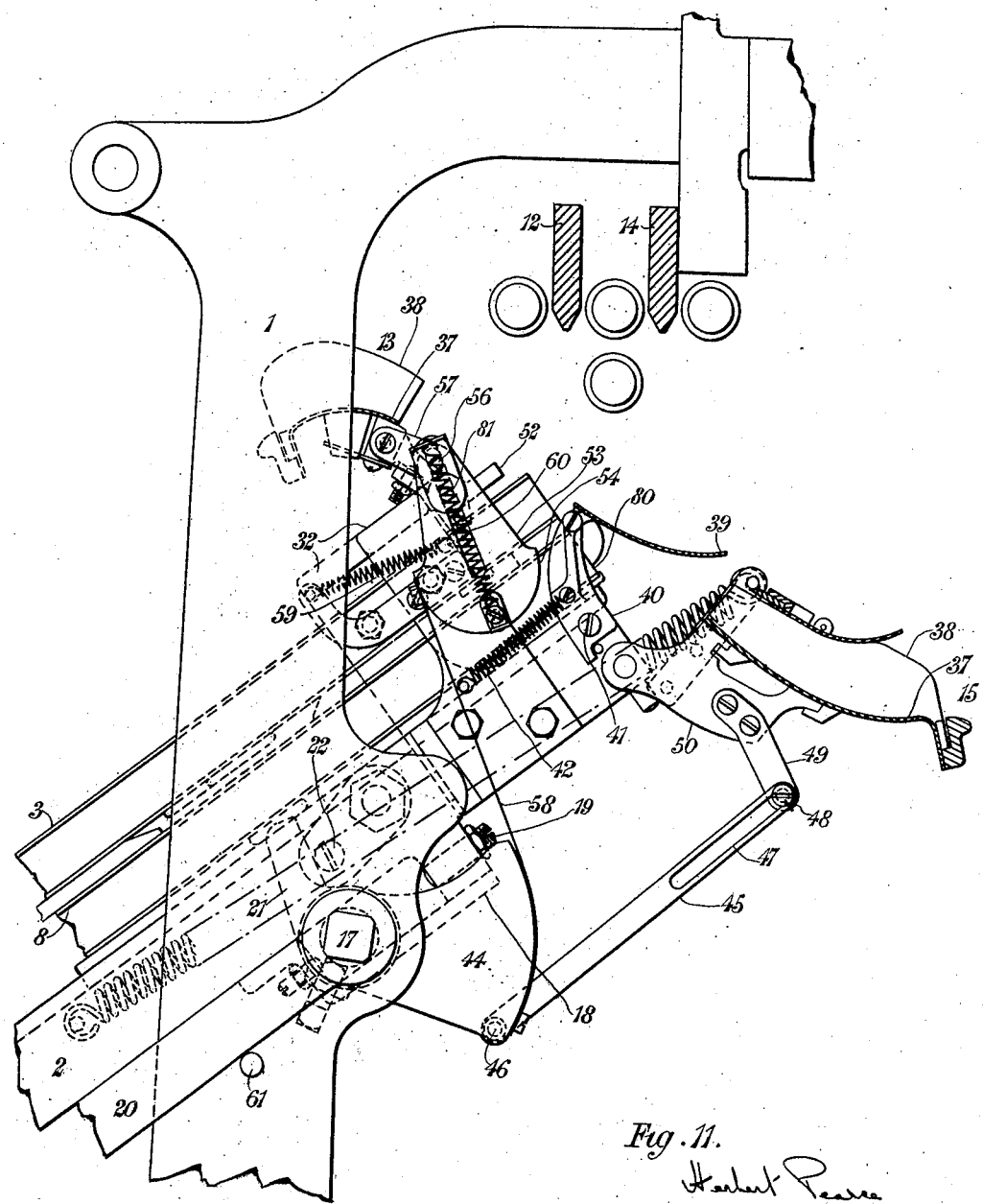
Figure 12:
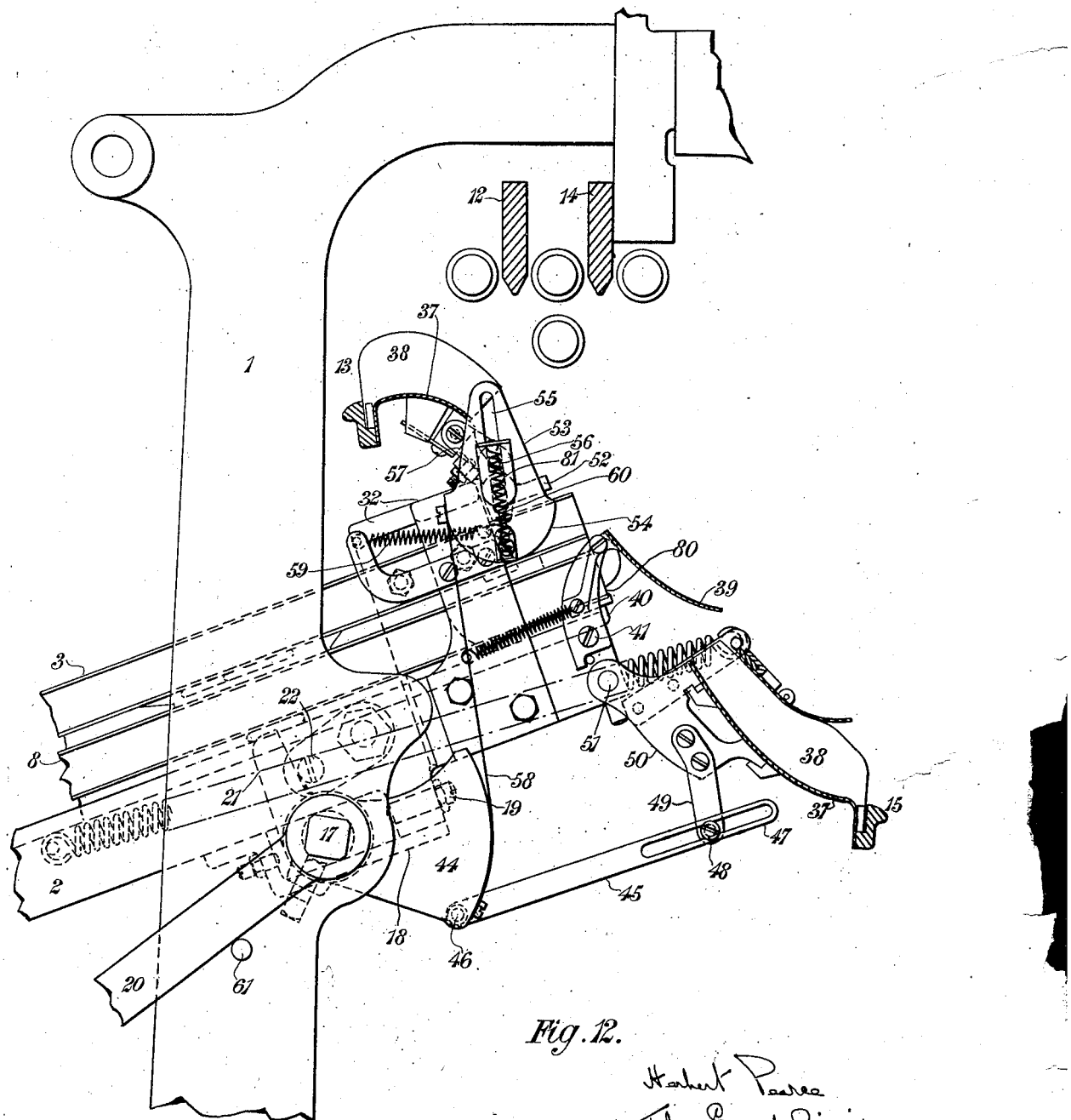
Figure 13:
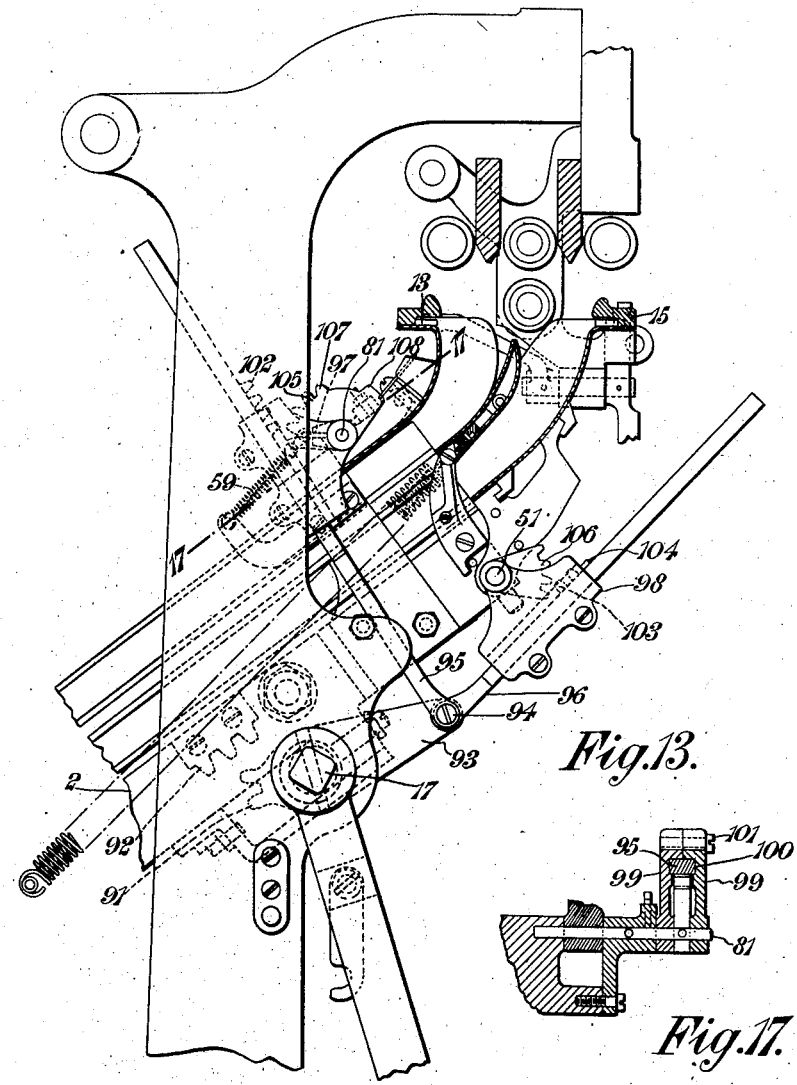
Figure 14:
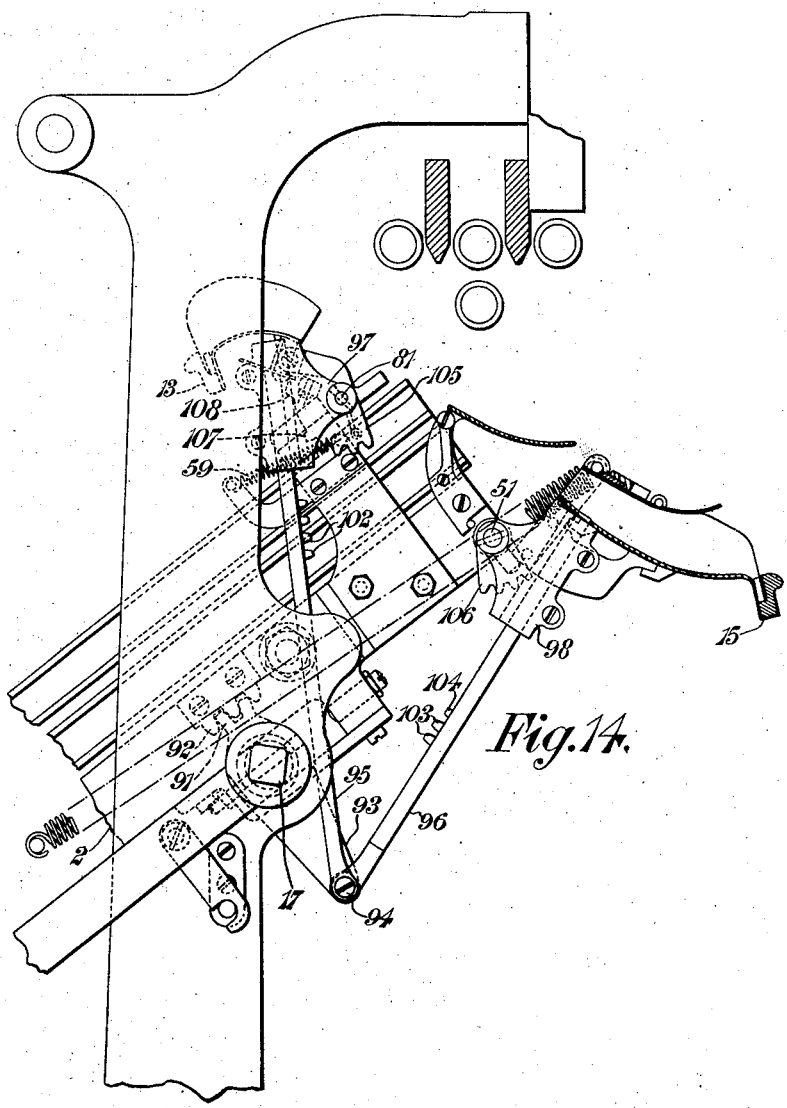
Figure 15:
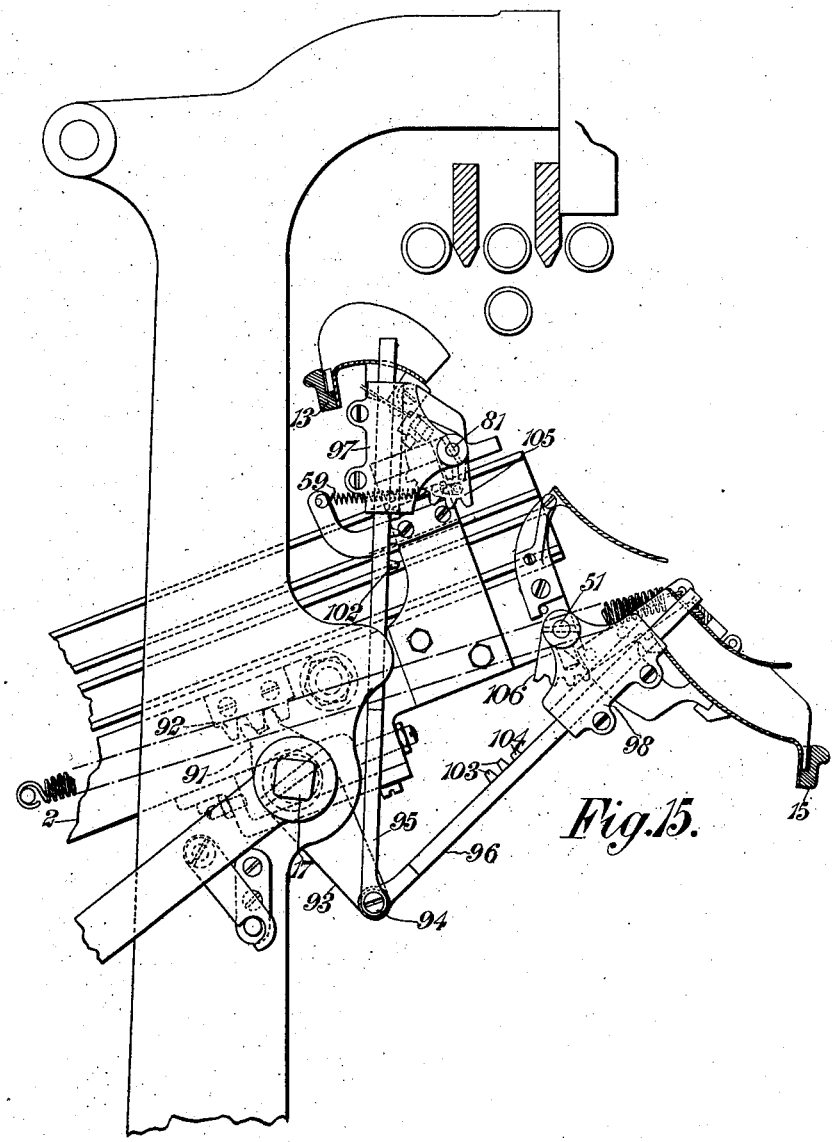
Figure 16:
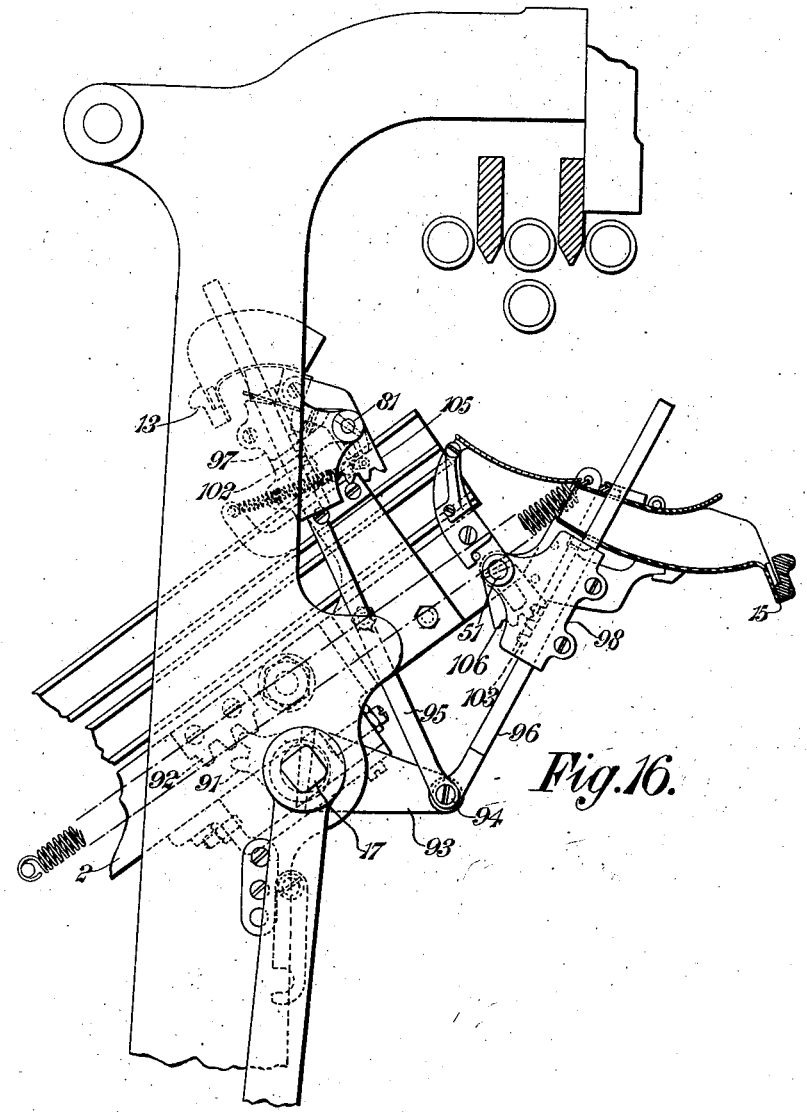

Referring to the accompanying drawings which are to be taken as part of this specification and read therewith, Figure 1 is a side elevation from the right hand side of the machine showing the latter equipped with two magazines both in the composing position: Figs. 2 and 2ª together form a similar elevation showing the magazine frame and all the magazines on it retracted and raised, the dot and dash lines showing an upper magazine ready for being taken off the machine: Fig. 3, a plan of the magazine frame; Fig. 4, an inverted plan of the bottom plate of the bottom magazine: Fig. 5, a plan of the bottom magazine: Fig. 6, an inverted plan of an upper magazine: Fig. 7, a transverse section on the line 7—7 of Fig. 2: Fig. 8, a side elevation as Fig. 1, illustrating a modification in the quick change mechanism shown in Figs. 1 and 2: Fig. 9, a side elevation as Fig. 2, corresponding with Fig. 8: Fig. 10, a detail side elevation of the improved means for opening and shutting the magazine entrance mouths: Fig. 11, a like elevation showing the magazines retracted and the magazine entrance mouths opened in consequence; Fig. 12, a like elevation showing how the magazine entrance mouth of the bottom magazine accommodates itself to the tilting motion of the latter. Fig. 13 is a detail side elevation of modified means for opening and shutting the magazine entrance mouths, the latter being seen in the closed position; Fig. 14 is a similar view showing the entrances in the open position and the magazines in the retracted position; Fig. 15 is a similar view showing the entrances open and the magazines retracted and tilted; Fig. 16 is a similar view showing the magazines almost returned to composing position and the entrances about to be closed and Fig. 17 is a cross section upon the line 17, 17, Fig. 13.

1 is the main frame of the machine; 2, the magazine frame; 3, an upper magazine; 4, one of its escapement rods; 5, the corresponding escapement lever; 6, the escapement lever spring; 7, the link connecting the said escapement rod 4 and lever 5; 8, the bottom magazine; 9, one of its escapement rods; 10, the corresponding escapement lever; 11, the escapement lever spring; 11ª, the upper part of the assembling mechanism; 12, the distributer and 13, the magazine entrance for the magazine 3; and 14, 15, respectively, the distributer and magazine entrance for the magazine 8. The front of the magazine frame 2 is supported by set screws 16 (only one appears in the drawings) adjusted in and locked to the main frame 1, while the rear of it rests upon a transverse shaft 17 turning in the sides of the main frame. 18 is a loop at each rear corner of the frame 2, embracing the shaft 17 and fitted with a set screw 19 bearing upon the rear side of the said shaft and adjusted to prevent the said frame sliding down over the shaft 17 and the set screws 16 too far.

20 is a hand lever fast on one end of the shaft 17; 21, an arm fast on the same shaft; and 22, a stud projecting laterally from the side of the frame 2 to the rear of and in touch with the respective arm 21, so that a pull of the lever 20 to the front, retracts the frame 2 far enough to disengage the set of levers 5 from the links 7.

The foregoing are substantially the same as heretofore.

Although only two magazines are shown in the drawings, it is to be distinctly understood that the invention is not limited to machines having only that number.

*Positioning the magazines.*—The bottom magazine 8 must be held definitely in one position upon the magazine frame 2 in order that when the latter is in the forward position, i. e., with its set screws 19 bearing against the rod 17, the delivery mouth 79 of the said magazine, shall register properly with the entrance to the assembling mechanism 11ª, that the escapement levers 10 shall be in proper position to be actuated by the escapement rods 9 and that the entrance mouth 80 of the said magazine, shall be in proper position for the magazine entrance 15 to register with it when that magazine entrance is shut. It is so held—Figs. 3, 4 and 7—by one or more bars 23 fast on its under face, extending from front to rear and engaging in corresponding grooves 24 in the magazine frame 2, and by a bar 25 likewise fast on its under face, extending across it at right angles with the bars 23 and having an off-set 26 at each end, the central portion of each bar 23 lying upon the frame 2 and each off-set 26 engaging in a corresponding groove 27 in the said frame. The bottom magazine 8 has also a strip 28—Figs. 1, 2 and 5—along the rear and side edges of its top face, for the next upper magazine, e. g., the magazine 3, to rest on. The bottom plate of each upper magazine 3, is stiffened—Fig. 6—by external horizontal bars 29 short enough to fit between the strips 28 on the magazine beneath it, e. g., the magazine 8; and its top plate has, like the bottom magazine 8, an external strip (not shown) such as the strip 28, along the rear and side edges thereof, for the next upper magazine to rest on. Each upper magazine is adjusted laterally into its definite position and held there, by four set screws—Figs. 1 and 7. There is one 30 near each rear corner of the magazine, working transversely in the side plate 31 of the magazine and which is thickened for the purpose, and bearing against the internal face of a bracket 32 fast to and upstanding from the magazine frame 2, and one 33, similarly connected to the respective and similarly thickened side 34 of the bottom magazine 8 near each bottom corner of it, and bearing against the internal face of a hook 35 fast to and depending from the said upper magazine. The latter is prevented from moving out of its definite position in a rear to front direction by the hooks 35 (there is one on each side of it) engaging under a corresponding lug 36 on the respective side of the next magazine beneath it, e. g., the magazine 8. The engaging faces of these hooks and lugs are, preferably, inclined as shown and because of the inclination of these faces there is a tendency to force the magazines into contact with each other.

*Magazine entrances.*—There is a matrix distributer for each magazine and it occupies the same relative position as heretofore. It is preferred that each distributer, as a whole, shall be a fixture upon the main frame 1, instead of being pivoted thereon. (The object of such pivoting has been to rock the distributer out of the path of a magazine that was being "quick changed" to the rear of the machine, as distinguished from over and down the front of it.) As the figures show two magazines 3 and 8, there are two distributers 12, 14, and both are on the same level. Each magazine entrance, 13 or 15, consists as heretofore of a bar 37 as long as a distributer and having fast to it, a series of webs 38 set at such distances apart that the spaces between them register with the matrix grooves in the respective magazine. Both bar 37 and webs 38 are shaped to establish a communication between the respective distributer and magazine. The entrances 13, 15, of two adjacent magazines, e. g., the magazines 3 and 8, have their series of webs 38 facing each other and there is a pivoted plate 39 of the same length between them, so that when the two magazine entrances 13, 15, are in the usual working position, or shut, each one serves, in combination with the said plate 39, as a divided conduit from the respective points along the distributer, 12 or 14, at which the matrices drop therefrom, to the corresponding matrix groove in the respective magazine. Each end of the plate 39 is pivoted to the top end of a bracket 40 pivoted at 41 on the respective side of the magazine frame 2. This pivoting allows of the plate 39 being rocked back out of the way when a magazine (either upper one, 3, or bottom one, 8,) is, after it has been tilted as by the means described further on, moved to the rear to disengage the hooks 35 from the lugs 36, the effect of such rocking back being to prevent the said plate being fouled by the magazine. When the magazine has been moved to the front again out of the way of the said plate 39, each bracket 40 is returned

to its original position by a spring 42, working between it and each side of the magazine frame 2. The plate 39 is returned by the magazine entrance 15 as the latter is being returned.

A magazine entrance such as 13 or 15, is always pivoted upon something to give access to the respective magazine for such purposes as inspecting it or removing a jammed matrix, the pivoting being either on the magazine, the magazine frame 2, or on the main frame 1. If a magazine entrance is pivoted on its magazine, the latter can be moved to the rear to some extent without making the magazine entrance (which it is assumed has not been opened, i. e., rocked on its pivot out of its working position—the one shown in Fig. 1) foul a pivoted distributer that likewise has not been rocked on its pivot out of its working position. But if a "quick change" involves moving the magazine to the rear to a material extent, (as it does in the above mentioned patent No. 787,817,) the magazine entrance must be opened before it can be so moved to the rear; and this holds good whether the magazine entrances are pivoted on their magazines, or on the magazine frame 2, or on the main frame 1. Now the operator may forget to open the magazine entrances, and if he does, the act of moving the magazine to the rear, will make them foul the distributer and damage it and perhaps themselves as well.

The present invention provides automatic mechanism for opening a pair of magazine entrances 13 and 15, the necessary power being taken from the means for retracting the magazine frame 2. According to the Patent No. 787,817 the opening mechanism consists essentially of the above described combination of a shaft as 17, arms as 21 and studs as 22 on the magazine frame 2. The present invention includes alternatives for the combination of arms 21 and studs 22 on the magazine frame 2, such, for instance, as pinions on the shaft 17 engaging with racks on the said frame 2 as hereinafter described with reference to Figs. 13 to 16. A means characterized by the turning shaft 17 is considered the most convenient one, but it is not the only practicable one, because the retraction can be begun by hand and completed by a spring pulling on the said frame 2, the spring being strong enough to do the major part of the work. The essence of the invention in this respect consists in the pair of magazine entrances being opened automatically by the means that retracts the magazine frame 2, whereby their being opened is independent of any intention on the part of the operator to so open them. For the purpose of this part of the invention, each magazine entrance may be pivoted to either an axis on the main frame 1 and beneath it, or to an axis in the main frame and above it, or to one in or on the magazine frame 2. The latter is preferred because of its simplicity and directness.

Referring to Figs. 10 to 12, there is a lost motion 43 between each arm 21 and stud 22, to provide for the two magazine entrances 13, 15 being each opened quickly enough and far enough to clear the respective distributers 12, 14, especially the traversing screws of the latter, before the retraction of the magazines can make them foul the same. When an arm 21 is midway toward the respective stud 22, a quadrant 44 fast on and turning with the shaft 17 and having a link 45 pivotally connected to its rear at 46, pulls the said link to the front, till a longitudinal slot 47 in the rear portion of the same, comes up to a stud 48 carried by the bottom magazine entrance 15. 48 is a stud projecting laterally from the rear end of a rearwardly projecting bracket 49 fast to the frame 50 that carries the said magazine entrance, in order that it may be well to the rear of the axis 51 of that entrance 15. The engagement of the rear end of a slot 47 with the respective stud 48, opens the magazine entrance 15 as far as is necessary, against the pull of the usual spring, the rearward movement of the magazine frame 2 being completed synchronously with that opening. The plate 39 and its brackets 40 being carried by the frame 2 as described, are moved to the rear at the same time, the plate dropping on its pivots for the purpose stated. The slot 47 serves the further purpose of allowing a bottom magazine entrance 15 being opened when the pair of magazines, 3 and 8, are in the composing position, independently of either the retraction of the magazine frame 2 or of the opening of the magazine entrance 13. The magazine entrance 13 is pivoted at 81 in brackets 52, one at each side of the respective magazine 3, projecting to the rear from the respective bracket 32.

53—Figs. 10 to 12—is a plate having a round end 54 and a longitudinal slot 55. The latter fits over the respective end of the pivot 81 as well as over a stud 56 fast to a short arm 57 fixed to the same end of the entrance 13. So long as the entrance 13 is shut—Fig. 10, the plate 53 stands with its round end 54 either toward the front as shown, or upward. The arc of the quadrant 44 is to the rear of its axis 17 and 58 is a flexible band connecting those points in the said arc and the round end 54 that are farthest from each other, in order that the pull on the lever 20 shall pull the end 54 downward (the plate 53 turning on the pivot 81), the opposite end of the said plate upward and, by reason of the slot 55 embracing the stud 56, open the entrance 13— Fig. 11.

59 is a spring pulling from a fixed point in front of each bracket 32, on to the outer end of the respective arm 57, to check the motion of the entrance 13 after its opening movement has carried it past its center of gravity. The tilting (described further on) of the magazine frame 2, requires that the plate 53 should move downward for a short distance and the slot 55 is long enough to allow it to do so. After it has done so, it is returned to its original position by a spring 60.

The flexible band 58 is desirable as a connection between the quadrant 44 and the plate 53, because its flexibility allows the magazine entrance 13 to be opened without moving the magazine frame 2 or opening the other entrance 15. The distance between the points of connection of the band 58 to the end 54 and quadrant 44 respectively, varies from one moment to another. This variation is provided for by the length of the slot 55. The band 58 may be replaced by an equivalent rigid connection, e. g., a rack pivoted on the quadrant 44 and engaging with a gear on the plate 53, but detachably so, to allow of the magazine entrance 13 being opened by hand independently of moving the magazine frame 2 to the rear or of opening the magazine entrance 15 also as hereinafter described with reference to Figs. 13 to 16.

*Quick changing.*—61 is a locking pin fitting in a socket in the main frame 1 to which it is or may be loosely attached by a chain 62. The socket is so positioned in the path of the lever 20, that the said pin must be withdrawn to allow of the said lever being pulled to the front and that such pull will take the lever past the socket, so that replacing the pin 61 in the socket, locks the magazine frame 2 in its retracted position. The magazine frame is tilted by any suitable means, preferably by—Figs. 1, 2, 8 and 9—levers 63 having their rear ends fulcrumed on a transverse shaft 64 in the rear portion of the main frame 1 and their front ends bearing on the underside of the magazine frame 2 near its front edge; a hand lever 65 fast to and projecting to the rear from a transverse shaft 66 turning in bearings in the main frame in which it is situated as far as, or farther to the rear than, the shaft 64; forwardly projecting arms 67 fast to the shaft 66; and links 68 connecting the front ends of the arms 67 to the levers 63. The pivot 9 of the links to the levers 63 is nearer to the front ends of the latter than to the shaft 64, whereby, so long as the magazine frame 2 is not tilted, the pivot 69 is in a vertical plane to the front of that which passes through the pivots of the arms 67 and links 68. The lever 65 is pulled down to tilt the magazine frame 2 and is stopped by the engagement of an off-set 70 on it with the main frame 1 when the magazine frame 2 has been tilted far enough, the arrangement being such that when the off-set 70 is in engagement with the main frame 1, the combined weight of the magazine frame 2 and magazines, thrusts the hand lever 65 to the front. The tilting of the magazine frame 2, rocks the already opened magazine entrance 15, to the front about its pivot 51, the stud 48 sliding along the slot 47 as indicated in Fig. 12, the slot being long enough to allow of it so doing. When the magazine frame 2 has been tilted—Figs. 2 and 9—the delivery mouths 82, 79, of both the magazines 3 and 8 stand at a higher level than the top of the assembling mechanism 11$^a$, but the two magazines are still locked together by the engagement of the hooks 35 with the lugs 36.

71 is a grip fast to and projecting laterally from each side of an upper magazine 3 to within reach of the operator.

72 is an arm on each side of the magazine frame 2 fast on a transverse shaft 73 turning therein. When the two magazines are in the composing position, both arms 72 stand up above an upper magazine and are also preferably inclined to the rear, a stud 74 on each then engaging with the bottom face of the magazine frame 2.

75 is a hook on the outer end of each arm. It is so proportioned and positioned on the respective arm 72, and the latter itself so dimensioned, that when the arm is in the position just described, either the respective hook or the adjacent edge of the arm, stands in the forward path of a lug 76 fast to and projecting laterally from each side of each of all the magazines.

All the magazines on the magazine frame 2, no matter how many there may be, can be taken off the machine by the operator, one by one, beginning with an upper one and finishing with the bottom one; and substitutes for them placed on the machine, beginning with a bottom one and finishing with an upper one. The process of taking off an upper magazine, the magazine frame 2 having been retracted and tilted, consists in seizing the two grips 71, sliding the magazine to the rear upon the one underneath it until the hooks 35 are clear of the lugs 36, raising its delivery mouth 82, pulling the magazine forward until the hooks 35 are on the top of the lugs 36, and continuing the pull until the lugs 76 fast to and projecting from its sides, come up to the hooks 75 and rock the arms 72 over to the front into the position shown by the dot and dash lines in Figs. 2 and 9. The arms 72 are now prevented rocking farther by the engagement of a stud 77 fast on each with the bottom face of the magazine frame 2. As the arms 72 are long enough to now hold their hooks 75 well in front of the assembling mechanism 11$^a$, the operator lets the magazine hang from them, then takes a fresh hold of it and lifts it off the said arms. Any intermediate magazines there may be between an upper and the bottom magazine are taken off the machine by the like means used in the way just described, excepting that as none of them have grips 71, the operator grips the delivery mouth to disengage its hooks 35 from the lugs 36 on the magazine next below it, to raise it, and to pull it to the front. A bottom magazine 8 is taken off the machine by seizing and raising its delivery mouth by hand, till the off-sets 26 are out of the grooves 27 and pulling it forward till the lugs 78 fast to and projecting from its sides near the upper ends thereof, coöperate with the arms 72 and the hooks 73 in the way already described in connection with the lugs 76.

83 is an interval in each side strip 28 to allow of the projection of the respective lug 76 or 78, and 84 is an incline on the respective strip in front of the respective lug which rides up it when the operator pulls the respective magazine to the front and down it as he pushes it to the rear. The invention in this respect consists in that all the magazines can be taken off the machine from the front and over the assembling mechanism. The process of mounting a substitute magazine or magazines on the machine is exactly the reverse of taking one or more magazines, respectively off the machine. The act of sliding a substitute upper magazine makes the grips 71 on it engage the front edges of the arms 72 and rock them to the rear past their pivots 73 whereupon they drop into their normal positions. When the required substitution has been completed, the magazine frame 2 and all the magazines on it, are lowered by reversing the hand lever 65, and moved to the front into composing position by reversing the lever 20.

According to the modification illustrated in Figs. 8 and 9, each pivoted arm 72 and the shaft 73 upon which it turns, are replaced by an arm 85, capable of sliding from rear to front and from front to rear along the respective sides of the magazine frame 2 in a direction parallel with the front to rear median line of that frame. The figures show this capacity as secured by means of a double V guide 86 fast along each side of the magazine frame 2 on which the respective arm engages by a correspondingly shaped groove 87. The hooks 75 project to the front and stand in or not lower than the forward path of the respective lugs 76 and the rear end of the top 88 of an arm 85 is on a level with the bottom of a lug 78 and is inclined upward as far as the forward path just mentioned, whence it is continued in the direction of the said path till it is merged in the hook 75 itself. 89 is a stud projecting laterally and inwardly from each arm 85 at the distance which an arm must slide, behind stops 90 fast to respective sides of the magazine frame 2, the two stops 90 being so positioned on the said frame that the studs 89 engage with them when the arms 85 hold the hooks 75 as far in front of the assembling mechanism 11$^a$ as the act of "quick changing" requires. Both arms are slid back along their guides 86 by the grips 71 engaging with the fronts of the hooks 75.

According to the modification shown in Figs. 13 to 16 the magazines are moved to and fro and the entrances are opened and closed by toothed gearing as hereinbefore stated. In these figures the shaft 17 has fixed to it a toothed segment 91 adapted to gear with a rack 92 fixed to the magazine frame 2. The quadrant 44 of the previous construction is replaced by an arm 93 fixed to the shaft 17 or made integral with the segment 91 and pivotally connected at 94 with two rack rods 95 and 96. These rods slide in respective guides 97 and 98, the guide 97 being loosely pivoted upon the pivot pin 81 of the upper entrance 13 and the guide 98 being loosely pivoted upon the pivot pin 51 of the lower entrance 15. The guides 97, 98 may be of similar construction, that is to say each may be composed of similar side members 99, Fig. 17, formed with guiding recesses or grooves 100 to receive the respective rack rod and held to one another by means of clamping or set screws 101. The members 99 of each pair are formed with thickened ends having plane meeting faces in order to correctly space apart the guide grooves 100. The reason for supporting the guides 97, 98 in this freely pivotal fashion is that the inclinations of the rack rods 95, 96 change according to the position of the arm 93, as will be seen by comparing the positions of the parts in Figs. 13 and 14. The rod 95 is provided with rack teeth 102 and the rod 96 with rack teeth 103 one of which is mutilated as shown at 104 for a purpose hereinafter explained. In place of the plate 53 of the previous constructions, a mutilated toothed segment 105 is mounted upon the pivot 81 of the entrance 13 and is fixedly connected with the latter and a buffer spring 59 similar to that previously described is operative upon the segment 105 as previously upon the plate 53. A toothed segment 106 is mounted upon the pivot 51 of the entrance 15 and is fixedly connected with the latter. Reference to Fig. 13 will show that the racks 102 and 103 are ready, upon downward movement of the arm 93, to gear respectively with the segments 105 and 106, whereas the segment 91 is so arranged that it must perform an appreciable portion of a revolution, say 21°, before gearing with the rack 92. This means that upon lowering the arm 93 the magazine entrances will first be opened to a sufficient extent and then only will the segment 91 commence to drive back the rack 92 so as to retract the magazine frame 2 and the superincumbent magazines. Nevertheless it will be observed from Fig. 13 that in the illustrated position of the parts, which is the normal position, the racks 102, 103 are just clear of respective toothed segments 105, 106, so that the entrances 13 and 15 are free to be opened by hand should occasion arise to necessitate such opening; this is what has been referred to as a detachable arrangement of the parts inasmuch as they disengage and the segments are left free as indicated.

The arrangement of the teeth upon the segment 105 is as follows:—there are four normal teeth, see Fig. 13, ready to engage with the rack teeth 102, then comes a mutilated tooth 107, then a gap, and finally a projection 108, the inner edge of which is shaped after the manner of a tooth. As will be seen by reference to Fig. 14, the entrance 13 in falling into its fully open position against the action of the spring 59 moves the segment 105 farther than it is possible for the rack teeth 102 to move; when, therefore, the rack rod 95 is again raised, the normal teeth of the segment 105 will be out of the path of the teeth 102, but the projection 108 will be in the path thereof. Fig. 16 shows the foremost one of the teeth 102 engaging the projection 108 and it will be understood that as the rack rod 95 is elevated, the segment is turned to move the entrance 13 toward its closed position. After a certain point has been reached, the entrance 13 will fall under the action of gravity and the mutilation of the segment 105 permits of this falling movement being freely performed, excepting for the action of the buffer spring 59 as before explained. The mutilation of the tooth 104 enables the rack teeth 103 to move into the position seen in Fig. 16 before actually engaging with the segment 106. From the position of the parts seen in Fig. 16 it will be understood that the magazine frame must be shifted forwardly toward composing position before the racks and segments come into respective engagement for closing the entrances.

We claim,

1. In a typographical composing machine of the type stated, the combination with two adjacent magazines arranged one above the other and supported in an inclined position, of hook and lug devices, coöperative inclined surfaces on said hook and lug adapted to hold the said magazines engaged and tending by gravity to force said magazines into contact with each other, and manual means for disengaging the upper magazine from the one beneath.

2. In a typographical composing machine of the multi-magazine type, the combination of magazine frame capable of being tilted on the main frame and having a front to rear guiding groove and transverse locking grooves; a bottom magazine; a guide bar fixed on the bottom of said magazine and adapted to run in the guiding groove; offsets on the bottom of said magazine adapted to interlock with said transverse grooves; brackets upstanding from the magazine frame by the sides of all the upper magazines; and set screws adjustable transversely in the sides of the magazines and bearing against the inner faces of respective brackets.

3. In a typographical composing machine of the multi-magazine type, the combination with the top plate of each magazine of a projecting strip along its rear edge; projecting strips one arranged along each side edge of said top plate and each formed with a gap; transverse bars on the bottom plate of each upper magazine of such a length as to fit between said projecting side strips on the magazine next beneath; a long transverse bar extending across and beyond the side edges of the said bottom plate and adapted to enter said gap; and an incline such as 84 bordering each of said gaps at one end thereof.

4. In a typographical composing machine of the type stated, the combination with a fixed distributing mechanism and a magazine retractor to disengage the magazines from their escapement mechanisms, of pivoted magazine entrances; and means actuated by the magazine retractor for opening and shutting the respective magazine entrance.

5. The combination with two retractable magazines having suitably pivoted magazine entrances and means for retracting both, of a quadrant turning with the retracting means; a plate slidably pivoted and loosely connected to one magazine entrance; a flexible connection between the said quadrant and plate; a link pivoted to the said quadrant; and a stud and slot connection between the link and the other magazine entrance.

6. The combination with two retractable magazines of magazine entrances one for each magazine, each of said entrances comprising a bar having a series of projecting webs, a pivotal support for each of said entrances, and a pivoted intermediate plate adapted to coöperate with both said pivotal entrances.

7. A typographical composing machine of the multi-magazine type comprising a frame adapted for forward removal of the magazines therefrom; coöperative means on respective magazines adapted to enable the several magazines to be removed forwardly one by one without disturbing the residue; and securing means on the several magazines adapted to lock one magazine to another and the bottom magazine to said frame and inclined engaging faces on said securing means for forcing the magazines into contact with each other.

8. The combination of a magazine supporting frame; one or more magazines supported thereon; guides on said framing; forwardly slidable arms in said guides adapted when moved forwardly to establish a track for a magazine during the sliding forward of the latter; stops on said arms; and coöperative stops on said frame.

9. The combination of a magazine supporting frame; one or more magazines supported thereon; guides on said framing; forwardly slidable arms in said guides adapted when moved forwardly to establish a track for a magazine during the sliding forward of the latter; lugs on a magazine to engage and pull the said arms in one direction; stops on said arms; coöperative stops on said frame; and grips on a magazine to engage said arms and return them.

10. A track for magazines being quick changed consisting of slidable arms as 85; guides such as 86 on the framing to receive grooves such as 87 in said arms; hooks such as 75 upon the forward ends of said arms; inwardly projecting studs such as 89 upon each of said arms; and stops such as 90 fixed upon said framing and in the path of said studs.

11. In a typographic machine a magazine supporting frame provided with a longitudinal guide 24 and transverse shoulders 27, in combination with a magazine provided with a longitudinal guide 23 and transverse lugs 26 to slide upon and interlock with said frame.

12. In a typographic machine of the class described a main frame and magazine supporting frame hinged to rise and fall therein, means for lifting and sustaining the forward end of the last named frame, a magazine provided with lateral projections and adapted to be withdrawn from the forward end of the supporting frame, and arms to sustain the offgoing magazine, said arms movably mounted on the magazine supporting frame and adapted to be moved forward to their operative positions by the projections on the offgoing magazine.

13. In a typographic machine a rising and falling frame and a magazine movable endwise therefrom, in combination with arms to temporarily support the magazine, said arms mounted on the supporting frame and movable to and from their operative positions by the magazine.

14. In a typographic machine and in combination with the main frame and the hinged magazine supporting frame, the lifting lever 65 and link 68, arranged to lock past the center in order to sustain the frame in its elevated position.

15. In a typographic machine and in combination with two magazines, one overlying the other, hinged entrances for said magazines and mechanism for simultaneously opening said entrances.

16. In a typographic machine two magazines, one overlying the other and each provided with a hinged entrance, in combination with common means for opening said entrances, said means adapted to permit the independent opening of either entrance manually at will.

17. In a typographic machine two magazines, one overlying the other, in combination with a channel entrance for the lower magazine arranged to swing downward from its operative position, a series of entrance partitions in the upper magazine arranged to swing upward from their operative position, and an intermediate downwardly swinging plate 39 to sustain the matrices entering the upper magazine.

18. In a typographic machine a magazine to receive the matrices, in combination with a magazine entrance composed of coöperating members 37 and 39, arranged to swing upward and downward respectively from their operative positions to permit access to the magazine.

19. In a typographic machine two magazines and hinged entrances therefor, in combination with a hand lever and coöperating devices to open and close the entrances simultaneously.

In witness whereof we have hereunto set our hands in the presence of two witnesses.

HERBERT PEARCE.
JOHN ERNEST BILLINGTON.

Witnesses:
GEORGE ERNEST BANNISTER,
WILLIAM HENRY SHARPE.